March 25, 1969   F. P. MILLER   3,434,566
SUPPORT APPARATUS
Filed June 5, 1967

FRANK P. MILLER
INVENTOR.

BY
ATTORNEY

United States Patent Office 3,434,566
Patented Mar. 25, 1969

3,434,566
SUPPORT APPARATUS
Frank P. Miller, 331 W. Leakwood Ave.,
La Habra, Calif. 90631
Filed June 5, 1967, Ser. No. 643,601
Int. Cl. E04g 3/16, 3/00; A64c 1/00
U.S. Cl. 182—15                                10 Claims

ABSTRACT OF THE DISCLOSURE

A support apparatus such as a movable cart having associated therewith a step ladder which is arranged to be concealed under the top of the cart or inclined at opposite ends of the cart.

---

This invention relates generally to a support apparatus and, more particularly, to a support apparatus such as a movable cart having combined therewith a step ladder.

Oftentimes movable carts are employed in warehouses, storage rooms, etc., for transporting items from one area to another. When the items on the cart are being placed on shelves or bins at various heights, or the cart is utilized to support items removed from shelves or bins, it is advantageous to gain additional height by standing on top of the cart to enable the worker to place or remove items on the topmost shelf or bin. However, since the cart can roll, the worker is oftentimes thrown off balance and is injured when striking the floor. What is needed, therefore, is a support apparatus such as a movable cart which permits a worker to gain additional height in storing or removing items from high shelves without the danger of the worker falling and being injured.

It is, therefore, the principal object of the present invention to provide an improved support apparatus having associated therewith a step ladder.

According to the principal aspect of the present invention, a step ladder is associated with a support apparatus, such as a movable cart, in such a fashion that the ladder may be concealed under the top of the cart when not in use, or may be moved rapidly to at least one end of the cart in an inclined position so that the worker may step on the ladder to gain additional height rather than on the top of the cart.

Other objects, aspects and advantages of the invention will become apparent from the following description taken in connection with the accompanying drawing wherein.

Figure 1:
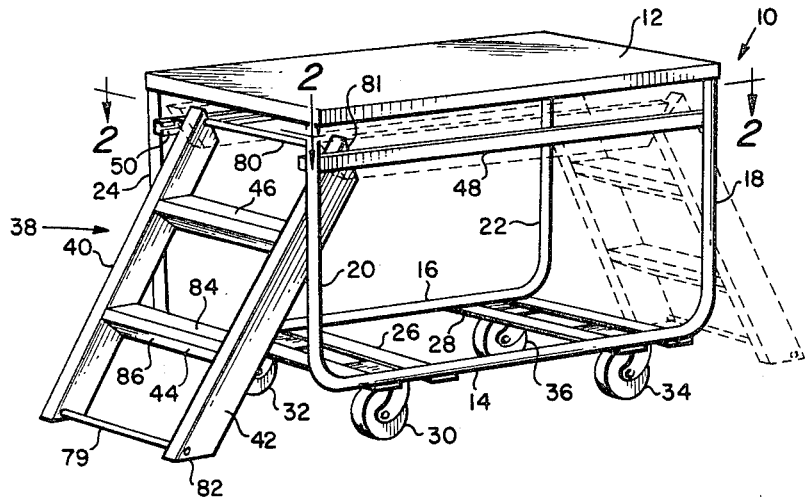
FIGURE 1 is a perspective view of a support apparatus employing a ladder in accordance with the present invention.

Referring now to the drawing in detail, wherein like reference characters designate like parts throughout the various views, there is illustrated in FIGURE 1 the support apparatus of the invention, generally designated by numeral 10, which is shown in the form of a movable cart. The cart 10 includes a flat top 12 and two generally U-shaped elements 14 and 16 providing vertical legs 18, 20, 22 and 24 which support the top 12. The elements 14 and 16 may be formed of round metal pipe or any other materials as desired. Horizontal cross members 26 and 28 join the lower portions of the U-shaped elements 14 and 16. Wheels 30, 32, 34 and 36 are mounted to the cross elements in any suitable fashion.

In accordance with the present invention, there is associated with the cart 10 a step ladder, generally designated by numeral 38. The ladder may be made of metal, wood or other strong materials, or any combination thereof. The ladder includes a pair of parallel side elements 40 and 42 and spaced cross elements 44 and 46.

Figure 4:
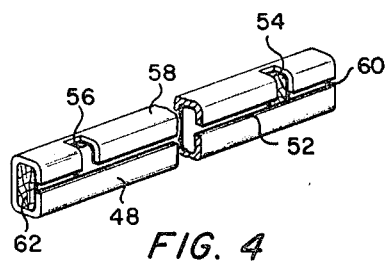
FIGURE 4 is a perspective, fragmentary view of one form of the rail utilized for mounting the ladder in the apparatus.

A pair of parallel, elongated members or rails 48 and 50 are attached by any suitable means such as welding, bolts or metal straps, not shown, to the legs 18, 20 and 22, 24, respectively, of the cart slightly below the top 12 and parallel thereto. The rails 48 and 50 as well as the legs of the cart are spaced apart a sufficient distance so as to permit the ladder 38 to be received therebetween when the ladder is in the position shown in phantom lines under the top 12 in FIGURE 1. One form of the rail of the invention is illustrated in FIGURE 4 and comprises a metal channel formed to provide an elongated slot 52 along its entire length. Slots 54 and 56 are formed in the top 58 of the channel adjacent to but spaced from its ends. Suitable blocks 60 and 62 close the opposite ends of the channel. It is understood that the rail 50 is of the same form as rail 48 and that the rails are mounted on the legs of the cart so that the slots 52 face each other.

Figure 5:
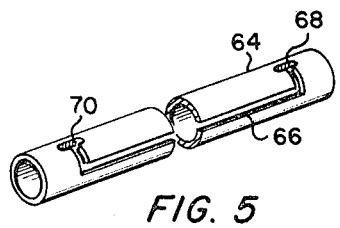
FIGURE 5 is a perspective, fragmentary view of another form of the rail employed in the apparatus of the invention.

FIGURE 5 illustrates another form of a rail 64 which may be employed in the apparatus of the invention. In this embodiment, the rail is in the form of a metal tube having an elongated slot 66 milled in its side with the ends of the slot extending upwardly to the top of the rail to provide openings 68 and 70 similar to openings 54 and 56 in the rail 48. Since the slot 66 terminates short of the end of the tube 64 there is no necessity for end blocks as in the rail illustrated in FIGURE 4. As in the cse of the rail disclosed in FIGURE 4, the rails 64 in FIGURE 5 would be mounted on the cart 10 of the invention so that their slotted sides face each other.

Figures 2, 3:
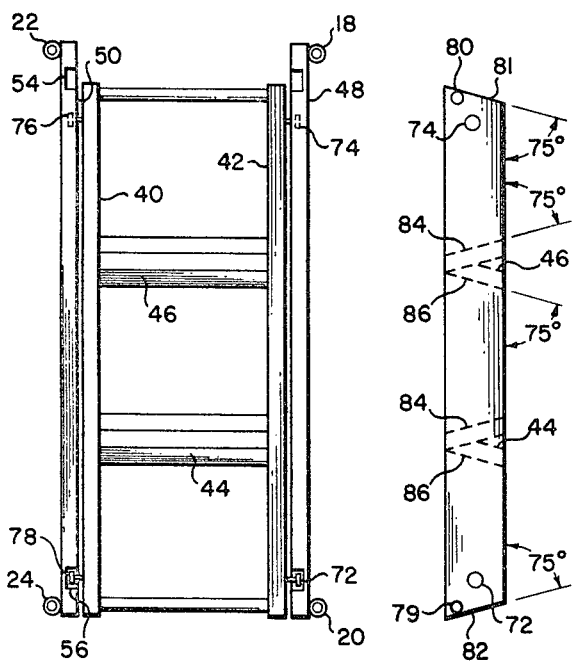
FIGURE 2 is a sectional view taken through the plane defined by lines 2—2 of FIGURE 1.
FIGURE 3 is a side view of the ladder employed in the apparatus of the invention.

As best seen in FIGURE 2, guide pins 72, 74, 76 and 78 are provided at the opposite ends of the side elements 40 and 42 of the ladder 38. The guide pins may be large headed carriage or machine bolts in which the shank has a diameter less than the width of the slots in the rails 48, 50 or 64 with the heads of the bolts being sufficiently small to permit insertion through the slots in the top of the rails. The guide pins are sufficiently long so that when the ladder is positioned horizontally under the top 12 of the cart 10, the pins will engage the slots 52 in the rails 48 and 50 as shown in FIGURE 2. The distance between the slots 54 and 56 in the top of the rails must be at least as great as the distance between the guide pins 72 and 74 and guide pins 76 and 78 at opposite ends of the ladder 38 to permit both ends of the ladder to engage the rails in the manner described below. In order to mount the ladder 38 under the table top in the position shown in phantom lines in FIGURE 1, the ladder is positioned so that the pins 74 and 76 engage the slots 56 at one end of the rails on the cart 10. The ladder is then moved along the rails with the free end of the ladder held higher than the rails until the guide pins 72 and 78 are above slots 56 in rails 48, 50 as illustrated in FIGURE 2 at which time the ladder is lowered until guide pins 72 and 78 engage slots 56, then enter and slide freely along slot 52. In this position, the ladder is stored and concealed under the top 12 of the cart 10 as shown in phantom lines in FIGURE 1.

When it is desired to use the ladder so that the worker may reach a height out of reach, the end of the ladder is pulled toward the worker until the guide pins 72 and 78 contact the end of the slots 52 in the rails 48 and 50. The ladder end is then lifted upwardly to disengage the guide pins 72 and 78 from the rails 48 and 50 and pulled again toward the worker, in a leftward direction as shown in FIGURE 1, until the guide pins 74 and 76 at the opposite end of the ladder contact the end of the slots 52 in the rails 48 and 50. At this point the worker will be holding one end of the ladder while nearly its entire length is extended horizontally and the other end of the ladder will be held in position adjacent one end of the cart 10 by the guide pins 74 and 76 engaging the rails 48 and 50. The end of the ladder held by the worker is then set down on the floor in the position shown in full lines in FIGURE 1. At this time the ladder is in position for use by the worker with the top of the ladder engaging the rails 48 and 50 of the cart 10 and inclined at an acute angle with respect to the vertical legs 20 and 24, with the lower end of the ladder being spaced away from the cart. To use the ladder at the other end of the cart, the reverse procedure is employed, in which case the ladder would be in the position shown in phantom lines at the right-hand side of the cart in FIGURE 1. To facilitate movement of the ladder to and from below the top 12 of the cart, rods or handles 79 and 80 are provided at the ends of the ladder. The rods preferably are immediately adjacent to the ends 81 and 82 of the ladder so that part of their surfaces rest on the floor when the end of the ladder engages the floor, thereby preventing breakage or bending of the rods when accidentally stepped upon.

It is of course appreciated that the length of the ladder 38 must be greater than the distance between the rails 48, 50 and the floor in order to permit the ladder to be disposed at an angle with respect to the legs of the cart 10. The length of the ladder 38 must be such that the ladder will be inclined at an angle greater than 60 degrees and preferably 75 degrees with respect to the horizontal plane to ensure that the majority of the worker's weight, when standing on the cross elements 44 and 46 of the ladder, will be distributed sufficiently in a vertical direction to prevent the cart from moving away from the ladder.

With the ladder designed so that it is inclined at 75 degrees with respect to the horizontal plane when disposed in the position shown in full lines in FIGURE 1, it is desirable to ensure maximum frictional engagement between the ends of the ladder and the floor by inclining the ends 81 and 82 of the side elements 40 and 42 of the ladder at an angle of 75 degrees with respect to the edges of the side elements as best seen in FIGURE 3.

According to another feature of the invention, the cross elements 44 and 46 of the ladder 10 have a generally V-shaped cross section so as to provide a pair of flat foot-engaging surfaces 84 and 86. As best seen in FIGURE 3, the surfaces 84 and 86 are inclined at an angle of 75 degrees with respect to the edge of the side elements 40 and 42 of the ladder so that the surface 84 on each cross element is parallel to the end 82 of the ladder while the surface 86 on each cross element is parallel to the inclined end 81 of the ladder. Consequently, regardless of whether the ladder is at one or the other end of the cart 10 in an inclined position, the foot-engaging surfaces of the ladder are horizontally disposed with respect to the floor.

While the adjustable ladder of the apparatus of the invention has been disclosed in connection with a movable cart 10, it is understood that the ladder could be associated with a stationary supporting apparatus, such as a conventional table, when it is desired to conceal the ladder when not in use. In addition, the invention is not necessarily limited to a ladder and rail arrangement which permits the ladder to be inclined at two ends of a support apparatus inasmuch as the essential features of the invention would be employed if the ladder were arranged to be inclined at only one end of the apparatus, in which case one of the slots 54 or 56 in the top of the rails 48 and 50 could be eliminated. It is further understood that the cross elements or steps 44 and 46 of the ladder may be replaced by round rungs but with the disadvantage that rungs are less comfortable to the feet of the user than the flat-surfaced cross elements 44 and 46.

Although several embodiments of the invention have been disclosed herein for purposes of illustration, it will be understood that various other changes can be made in the form, details, arrangement and proportions of the various parts in such embodiments without departing from the spirit and scope of the invention as defined by the appended claims.

I claim:

1. A support apparatus comprising a top and a plurality of generally vertical legs supporting said top wherein the improvement comprises:
   ladder means;
   means adjustably mounting said ladder means in three positions with respect to said top and legs;
   said ladder means in the first of said positions being substantially horizontally disposed below said top;
   said ladder means in the second of said positions being disposed at an acute angle with respect to said legs, with the upper end of said ladder means being adjacent to one end of said top, and with the lower end of said ladder means being spaced outwardly from said one end of said top and adapted to engage the surface supporting said apparatus; and
   said ladder means in the third of said positions being disposed at an acute angle with respect to said legs, with the upper end of said ladder means being adjacent to the other end of said top, and with the lower end of said ladder means being spaced outwardly from said other end of said top and adapted to engage said supporting surface.

2. A support apparatus as set forth in claim 1 wherein said mounting means includes a pair of slotted elongated members positioned below said top and spaced apart a sufficient distance to receive therebetween said ladder means.

3. A support apparatus as set forth in claim 2 wherein said mounting means includes guide pins extending laterally outwardly from both sides of said ladder means adjacent to the respective ends thereof;
   said guide pins at both ends of said ladder means engaging said pair of slotted elongated members in said first position of said ladder means;
   said guide pins at only one end of said ladder means engaging said slotted elongated members adjacent to one end thereof in said second position of said ladder means; and
   said guide pins at only the other end of said ladder means engaging said slotted elongated members adjacent to the other end thereof in said third position of said ladder means.

4. A support apparatus as set forth in claim 3 wherein said slotted elongated members include means adjacent to the ends thereof permitting removal of said guide pins therefrom.

5. A support apparatus as set forth in claim 1 wherein said ladder means includes a plurality of cross elements;
   each of said cross elements being shaped to provide two foot-engaging surfaces disposed at angles such that one of said surfaces is substantially horizontal when said ladder means is in said second position and the other of said surfaces is substantially horizontal when said ladder means is in said third position.

6. A support apparatus comprising a substantially flat top and a plurality of generally vertical legs supporting said top wherein the improvement comprises:
   ladder means including a pair of parallel side elements and a plurality of spaced cross elements connected to said side elements;
   a pair of parallel, elongated members mounted below said flat top and spaced apart a distance greater than the width of said ladder means, at least one end of said ladder means being positioned between said elongated members;

said elongated members having elongated slots in their opposed faces extending to points adjacent to but spaced from the respective ends of said members, the ends of said slots terminating in the upper surfaces of said members; and guide pins extending laterally outwardly from said side elements of said ladder means adjacent to the respective ends thereof, said guide pins adjacent to at least said one end of said ladder means engaging said slots in said elongated members.

7. A support apparatus as set forth in claim 6 wherein the distance between said guide pins along the length of said side elements is at least as great as the distance between said ends of said slots along the length of said elongated members.

8. A support apparatus as set forth in claim 6 wherein said cross elements have a generally V-shaped cross section providing first and second foot-engaging surfaces;

said first foot-engaging surface being substantially horizontal when said guide pins adjacent to said one end of said ladder engage one end of said slots and the other end of said ladder means engages the surface supporting said apparatus; and said second foot-engaging surface being substantially horizontal when said guide pins adjacent to the other end of said ladder means engage the other end of said slots and said one end of said ladder means engages said supporting surface.

9. A support apparatus as set forth in calim 8 wherein the ends of said side elements of said ladder means at said other end thereof are parallel to said first foot-engaging surface; and the ends of said side elements of said ladder means at said one end thereof are parallel to said second foot-engaging surface.

10. A support apparatus comprising a substantially flat top and a plurality of generally vertical legs supporting said top wherein the improvement comprises:

ladder means including a pair of parallel side elements and a plurality of spaced cross elements connected to said side elements;

a pair of parallel, elongated members mounted below said flat top and spaced apart a distance greater than the width of said ladder means, at least one end of said ladder means being positioned between said elongated members;

said elongated members having elongated slots in their opposed faces extending to points adjacent to but spaced from the respective ends of said members, at least one of the corresponding ends of said slots terminating in the upper surfaces of said members; and guide pins extending laterally outwardly from said side elements of said ladder means adjacent to the respective ends thereof, said guide pins adjacent to at least said one end of said ladder means engaging said slots in said elongated members and being sufficiently small so as to be capable of being freely passed through the portions of said slots which terminate in the upper surfaces of said members.

References Cited

UNITED STATES PATENTS 2,969,850  1/1961  Hillis _____ 182—88

FOREIGN PATENTS 903,771  8/1962  Great Britain.

REINALDO P. MACHADO, *Primary Examiner.*

U.S. Cl. X.R.

182—88, 115